UNITED STATES PATENT OFFICE.

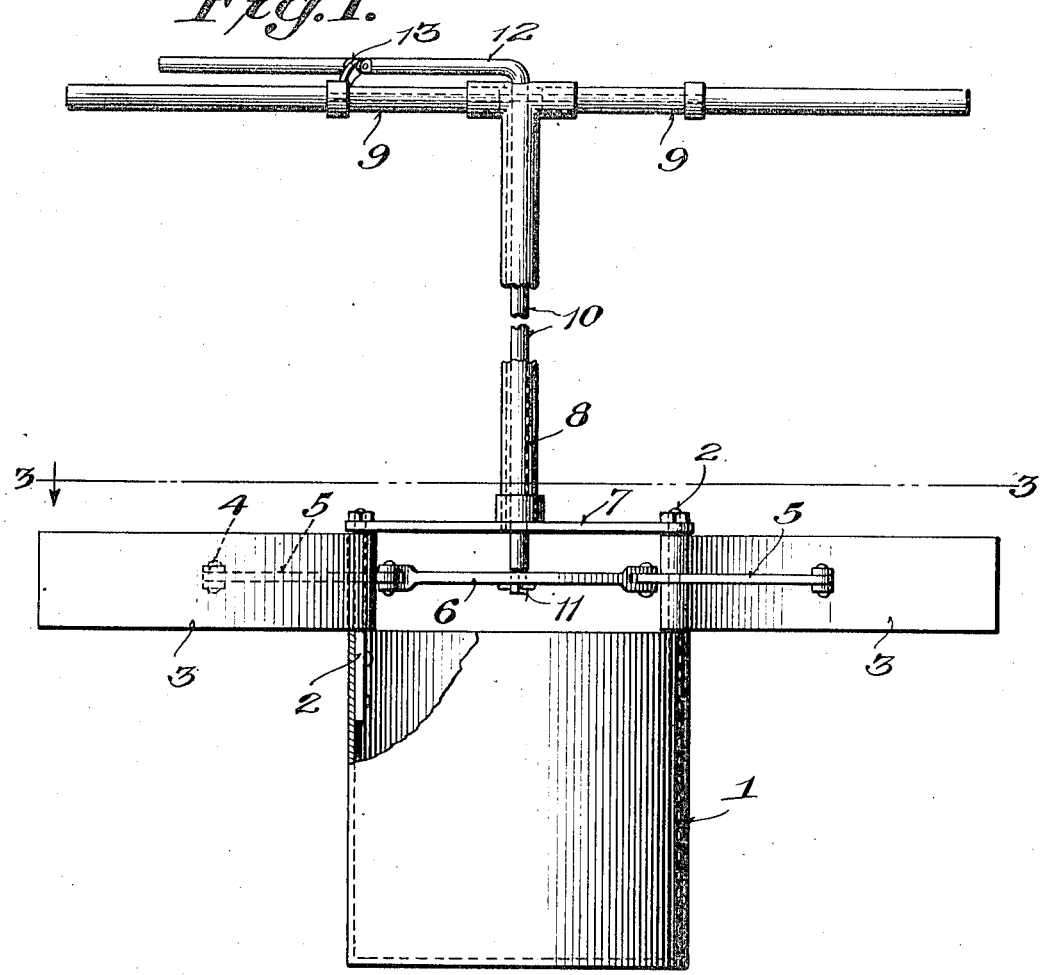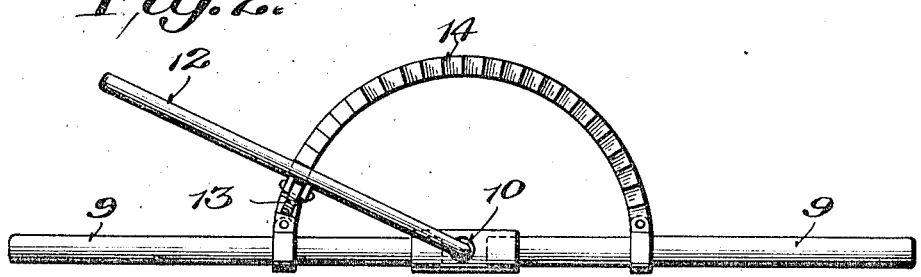

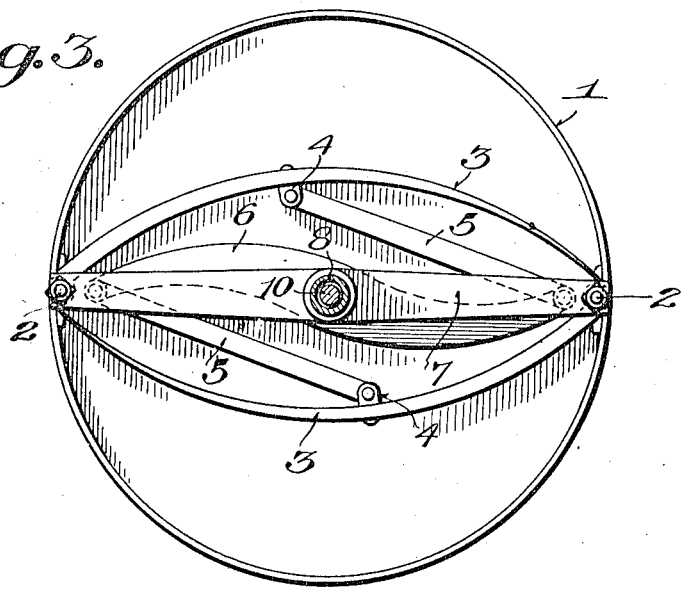
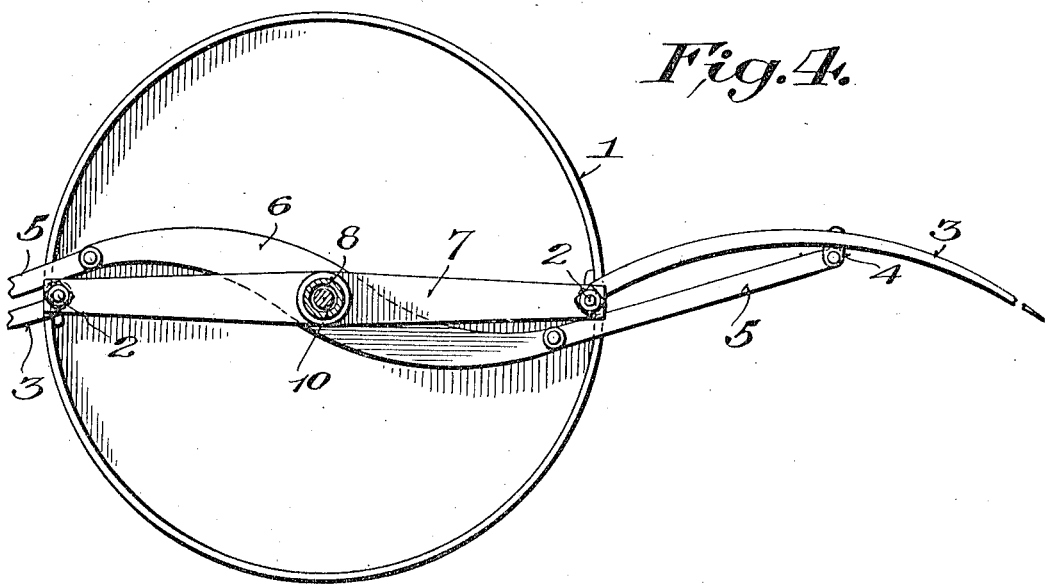

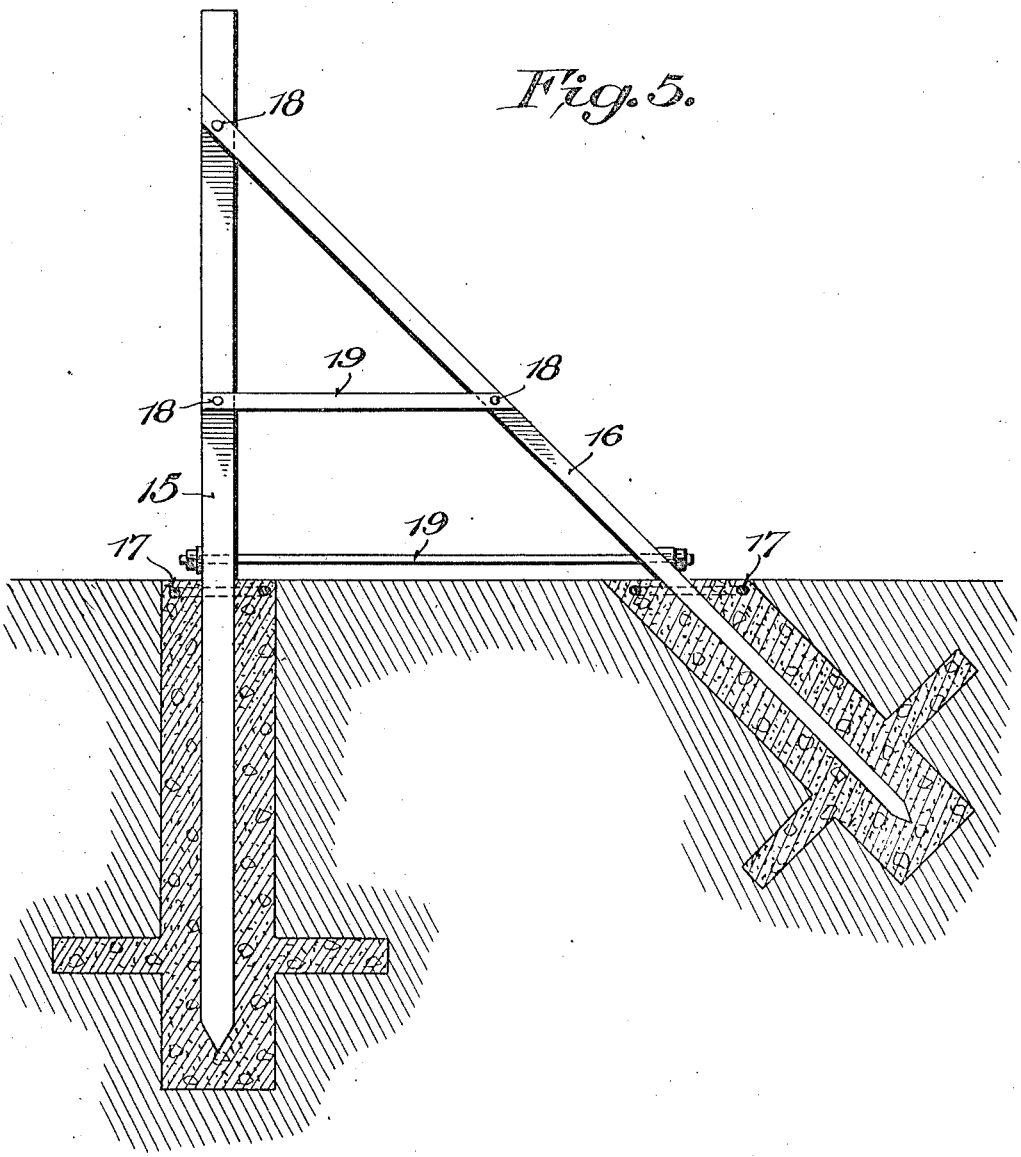

NELS J. JOHNSON, OF HIGH LAKE TOWNSHIP, EMMET COUNTY, IOWA.

POST-HOLE REAMER.

1,298,509.     Specification of Letters Patent.     Patented Mar. 25, 1919.

Application filed December 11, 1918. Serial No. 266,263.

*To all whom it may concern:*

Be it known that I, NELS J. JOHNSON, a citizen of the United States, and resident of High Lake township, Emmet county, and State of Iowa, have invented certain new and useful Improvements in Post-Hole Reamers, of which the following is a specification.

My invention relates to means for reaming the holes for posts of fences, windmills, etc., the object being to enable the enlargement of the hole in the earth at any desired distance below the surface, so that suitable anchorage may be secured for the post when set in the ground.

In the accompanying drawings,—

Figure 1 is a side elevation, with part of the shaft broken away, of my improved reaming device;

Fig. 2 is a plan view of the upper end thereof;

Fig. 3 is a plan view of the lower end, showing the reaming blades and their operating mechanism collapsed;

Fig. 4 is a similar view, showing such parts fully extended; and

Fig. 5 is a sectional elevation, illustrating the setting of a post, as, for example, the end post of a wire fence as accomplished by the use of my invention.

1 is a bucket having preferably cylindrical side walls and closed bottom, which may be fixed or movable. Attached to the bucket 1 and extending somewhat above its upper end are pivot bars 2, whereupon are hinged blades 3, having preferably the tapered and curved form in top view shown in Figs. 3 and 4, so as to form sharpened scoops. The blades 3 have jointed to them at 4, links 5, pivoted to the opposite ends of a two-armed lever 6, which may have the ogee curve shown in the top views of Figs. 3 and 4. The bucket 1 has attached to it a crossbar 7, as, for example, by being rigidly bolted at its ends to the tops of the pivot bars 2, and mounted rigidly upon the crossbar 7 is a hollow standard 8, which may be several feet in height and which has an operating handle 9 at its upper end whereby the bucket and reaming blades may be lowered into the hole and lifted therefrom. Extending centrally through the hollow standard 8 is the operating shaft 10 for the reaming blades, which has at 11 non-rotative connection with the blade operating lever 6, as by having a square end engaging a similarly shaped aperture in said lever. The upper end of the operating shaft 10 has a rectangularly disposed operating lever 12, whose lock pawl 13 travels over an arc-shaped rack 14 rigid with the handle 9.

In employing the invention in the setting of posts for fences and other purposes, a hole is first sunk in the earth, as by an earth auger. My improved reamer is then arranged with the blades collapsed, as shown in Fig. 3, the reamer operating lever 12 being manipulated to effect this collapsing of the reaming blades. The tool is lowered then into the hole until the depth is reached at which the blades will form an annular reaming at the point desired, as, for example, at a point above the bottom of the hole represented by the height of the bucket 1. The handle 12 is then slightly rotated and held in the rotated position by the pawl 13 and rack 14, the scooping blades 3 being by such motion of the lever brought so that they project slightly beyond the periphery of the bucket. The tool is then rotated and a first layer of earth reamed off, the separated earth falling into bucket 1. From time to time the tool is lifted out and the earth removed, and at any time the blades may be adjusted out ard to take in further portions of the earth, a d may be collapsed completely to enable the tool to be withdrawn after emptying the bucket.

The tool may, for example, be used for reaming out anchor seats for post holes and holes for post braces, as shown in Fig. 5. The hole of the shaft represented being thus formed, cement or cement concrete is poured in, the post 15 and its brace 16 pressed into the concrete, a ring or plate 17 of metal pressed down into the concrete at top to assist in preventing cracking, and the structure fastened as by bolts or rivets 18 and cross-braces 19. A structure is thus formed which resists all tendency to the lifting action of the wind or the strain of a wire fence.

I claim:—

1. A reaming tool having a dirt receiving bucket, a standard rigidly attached to said bucket, scooping blades hinged to said bucket, an operating shaft for said blades extending through said standard, a lever for operating said shaft at the upper end of the standard, and means for locking said lever.

2. A reaming tool having a dirt receiving bucket provided with pivot bars, reaming blades pivoted on said bars, a two-armed blade operating lever linked to said blades, a cross-bar connecting the upper ends of said pivots, a hollow standard carried by said cross-bar, an operating shaft for said blade operating lever extending through said standard, a lever on said shaft, a locking pawl, and a locking segment for said shaft.

The foregoing specification signed at Estherville, Iowa this 8th day of December, 1918.

NELS J. JOHNSON.